US012800299B2

(12) United States Patent
Hoff

(10) Patent No.: US 12,800,299 B2
(45) Date of Patent: Nov. 17, 2026

(54) INTERNAL VEHICLE MOUNT FOR PORTABLE COORDINATE-MEASURING MACHINE BASE

(71) Applicant: Toyota Motor Engineering & Manufacturing North America, Inc., Plano, TX (US)

(72) Inventor: Aaron J. Hoff, Cynthiana, KY (US)

(73) Assignees: TOYOTA MOTOR ENGINEERING & MANUFACTURING NORTH AMERICA, INC., Plano, TX (US); TOYOTA JIDOSHA KABUSHIKI KAISHA (JP)

( * ) Notice: Subject to any disclaimer, the term of this patent is extended or adjusted under 35 U.S.C. 154(b) by 308 days.

(21) Appl. No.: 18/769,155

(22) Filed: Jul. 10, 2024

(65) Prior Publication Data

US 2026/0016293 A1 Jan. 15, 2026

(51) Int. Cl.
*G01B 21/04* (2006.01)

(52) U.S. Cl.
CPC .................................. *G01B 21/047* (2013.01)

(58) Field of Classification Search
CPC ........ G01B 5/008; G01B 5/012; G01B 21/04; G01B 21/047; G01B 21/02; G01B 21/00
USPC .................... 33/503, 556, 288; 702/150, 152
See application file for complete search history.

(56) References Cited

U.S. PATENT DOCUMENTS 7,017,275 B2 * 3/2006 Raab ...................... G01B 11/25 33/503
7,032,321 B2 * 4/2006 Raab ...................... B25J 9/1602 33/503
7,120,524 B2 10/2006 Srack et al.
7,246,030 B2 * 7/2007 Raab .................... G01B 21/042 702/155
7,376,492 B2 * 5/2008 Srack ................... G01B 5/0025 701/1
7,591,078 B2 * 9/2009 Crampton ............. B25J 13/088 33/503
7,874,078 B2 * 1/2011 Harrill .................. G01B 11/16 33/608

(Continued)

FOREIGN PATENT DOCUMENTS

CN 201555577 8/2010
CN 102288143 12/2011

(Continued)

*Primary Examiner* — Peter J Macchiarolo
(74) *Attorney, Agent, or Firm* — Snell & Wilmer LLP

(57) ABSTRACT

A vehicle mount for a portable apparatus for measuring a vehicle frame is configured to be mounted to existing seat mounts (e.g., seat bolt holes) of the vehicle frame. The vehicle mount includes one or more support rails including at least one attachment feature for mounting the vehicle mount to the vehicle frame. The vehicle mount further includes one or more guide rails supported by the support rail(s). The vehicle mount further includes a mounting plate supported by the guide rail(s) and configured to receive a measuring apparatus. The mounting plate can be configurable between an unlocked state, wherein the mounting plate is moveable with respect to the first guide rail and the second guide rail, and a locked state, wherein the mounting plate is locked in position with respect to the first guide rail and the second guide rail.

18 Claims, 7 Drawing Sheets

(56) References Cited

U.S. PATENT DOCUMENTS

| | | | | |
|---|---|---|---|---|
| 8,117,002 | B2 * | 2/2012 | Venalainen | G01B 5/0025 702/92 |
| 8,604,437 | B2 | 12/2013 | Warkotsch et al. | |
| 9,513,100 | B2 * | 12/2016 | Raab | G01B 7/008 |
| 9,594,250 | B2 * | 3/2017 | Tait | G01S 19/01 |
| 9,733,065 | B2 * | 8/2017 | Cagle | G01B 11/24 |
| 10,126,116 | B2 * | 11/2018 | Becker | G01S 17/89 |
| 10,168,134 | B2 * | 1/2019 | Raab | G01B 11/005 |
| 10,401,144 | B2 | 9/2019 | Pettersson et al. | |
| 10,883,819 | B2 * | 1/2021 | Becker | G01S 17/48 |
| 12,044,519 | B2 * | 7/2024 | Van Esch | G01B 5/20 |
| 2008/0072444 | A1 * | 3/2008 | Harrill | G01B 11/002 33/600 |
| 2009/0013547 | A1 * | 1/2009 | Ferrari | G01B 5/0014 33/503 |
| 2012/0291297 | A1 * | 11/2012 | Ferrari | G01B 21/047 33/503 |
| 2017/0191822 | A1 * | 7/2017 | Becker | G06T 7/33 |
| 2018/0149469 | A1 * | 5/2018 | Becker | G01B 11/002 |

FOREIGN PATENT DOCUMENTS

| | | |
|---|---|---|
| CN | 102679929 | 9/2012 |
| CN | 202692959 | 1/2013 |
| CN | 210232210 | 4/2020 |
| CN | 110307813 | 6/2020 |
| CN | 110303345 | 4/2024 |

* cited by examiner

INTERNAL VEHICLE MOUNT FOR PORTABLE COORDINATE-MEASURING MACHINE BASE

BACKGROUND

1. Field

The various aspects and embodiments described herein relate generally to a measuring system used to determine dimensional measurements of a vehicle frame and, in particular to an apparatus and method for mounting the measuring system to the vehicle.

2. Description of the Related Art

The structural foundation of many common vehicle designs is the frame. The frame can be made of multiple frame members, often formed of metals such as steel. Some vehicles include a unibody design, in which the frame is integrated with the body. Additional vehicle components, such as the engine, body, power train, and interior, are ultimately connected to and supported by the frame. Accordingly, the frame forms the structural foundation of a vehicle to which all of the remaining components are ultimately attached.

Due in part to the complex shapes of many vehicle frames, as well as to the wide variety of different vehicle frames, it is important that the vehicle frame is built to specification during manufacturing of the vehicle to ensure the remaining vehicle components can properly attach to the vehicle frame and properly align with one another. Moreover, vehicle frames can become bent from an original configuration, for example due to a collision.

One method of measuring a vehicle frame is to mount a measuring device to a support surface (e.g., the ground) outside of the vehicle frame and to position a measuring portion of the measuring device to extend through an opening (e.g., a door opening) in the vehicle frame to measure various points on the vehicle frame. In this configuration, the vehicle frame is capable of moving relative to the measuring device, in which case the system may need recalibrating.

SUMMARY

In general, one aspect of the subject matter described in this disclosure may be embodied in a vehicle mount for a portable apparatus for measuring a vehicle frame. The vehicle mount includes a first support rail including a first attachment feature for mounting the vehicle mount to the vehicle frame, a second support rail including a second attachment feature for mounting the vehicle mount to the vehicle frame, a first guide rail supported by the first support rail and the second support rail, a second guide rail supported by the first support rail and the second support rail, the second guide rail is oriented in parallel with, and spaced apart from, the first guide rail, and a mounting plate extending between and to the first guide rail and the second guide rail. The mounting plate is configurable between an unlocked state, wherein the mounting plate is moveable with respect to the first guide rail and the second guide rail, and a locked state, wherein the mounting plate is locked in position with respect to the first guide rail and the second guide rail.

In another aspect, the subject matter may be embodied in a portable apparatus for measuring a vehicle frame. The portable apparatus includes a movable arm and a vehicle mount configured to support the movable arm. The movable arm has opposed first and second ends, a support base attached to the first end of the movable arm, a head attached to the second end of the movable arm, a plurality of joints with each joint corresponding to a degree of freedom such that said arm is movable within a selected volume, a plurality of position sensors, each position sensor configured to produce a position signal, and a controller for receiving the position signals from the position signals and providing a digital coordinate corresponding to a position of the head in the selected volume. The vehicle mount includes a first support rail including a first attachment feature for mounting the vehicle mount to the vehicle frame, a second support rail including a second attachment feature for mounting the vehicle mount to the vehicle frame, a first guide rail supported by the first support rail and the second support rail, a second guide rail supported by the first support rail and the second support rail, the second guide rail is oriented in parallel with, and spaced apart from, the first guide rail, and a mounting plate configured to receive the support base of the movable arm, the mounting plate extending between and to the first guide rail and the second guide rail. The mounting plate is configurable between an unlocked state, wherein the mounting plate is moveable with respect to the first guide rail and the second guide rail, and a locked state, wherein the mounting plate is locked in position with respect to the first guide rail and the second guide rail.

These and other embodiments may optionally include one or more of the following features.

The first attachment feature can be configured to align with a first seat mount of the vehicle frame and the second attachment feature can be configured to align with a second seat mount of the vehicle frame. The vehicle mount can be configured to be secured to the vehicle frame via the first seat mount and the second seat mount.

The mounting plate can be configured to receive the apparatus for measuring the vehicle frame. The apparatus for measuring the vehicle frame can be the movable arm.

The first guide rail can include a first rod whereby the mounting plate is slidingly coupled to the first guide rail. The second guide rail can include a second rod whereby the mounting plate is slidingly coupled to the second guide rail.

The vehicle mount can further include a first clamp mounted to the mounting plate and configured to secure the mounting plate in a plurality of positions along the first guide rail. The vehicle mount can further include a second clamp mounted to the mounting plate and configured to secure the mounting plate in a plurality of positions along the second guide rail.

The mounting plate can be configured to move along the first guide rail and the second guide rail in a first direction. The first guide rail and the second guide rail can be adjustable along the first support rail and the second support rail in a second direction perpendicular to the first direction.

The first attachment feature can be configured to receive a first fastener for coupling the vehicle mount to the vehicle frame. The second attachment feature can be configured to receive a second fastener for coupling the vehicle mount to the vehicle frame.

In another aspect, the subject matter may be embodied in a method for measuring a vehicle frame. The method can include mounting a vehicle mount to the vehicle frame using existing seat mounts of the vehicle frame. The method can further include mounting a movable arm to the vehicle mount. The method can further include moving the head to a first known feature of the vehicle frame. The method can further include logging a first digital coordinate of the first known feature. The method can further include moving the head to a second known feature of the vehicle frame. The method can further include logging a second digital coordinate of the second known feature. The movable arm can have opposed first and second ends, a support base attached to the first end of the movable arm and configured to be mounted to a mounting plate of the vehicle mount, a head attached to the second end of the movable arm, a plurality of joints with each joint corresponding to a degree of freedom such that said arm is movable within a selected volume, a plurality of position sensors, each position sensor configured to produce a position signal, and a controller for receiving the position signals from the position signals and providing a digital coordinate corresponding to a position of the head in the selected volume.

These and other embodiments may optionally include one or more of the following features.

In various aspects, the vehicle mount includes a base portion and the mounting plate moveable with respect to the base portion, and mounting the movable arm to the vehicle mount includes mounting the movable arm to the mounting plate.

In various aspects, the head is moved from the first known feature to the second known feature while the mounting plate remains stationary with respect to the vehicle frame.

In various aspects, mounting a vehicle mount to the vehicle frame using existing seat mounts of the vehicle frame includes aligning a first attachment feature of the vehicle mount with a first seat mount of the vehicle frame, and aligning a second attachment feature of the vehicle mount with a second seat mount of the vehicle frame.

In various aspects, mounting a vehicle mount to the vehicle frame using existing seat mounts of the vehicle frame includes inserting a first fastener through the first attachment feature of the vehicle mount and at least partially into the first seat mount, and inserting a second fastener through the second attachment feature of the vehicle mount and at least partially into the second seat mount.

BRIEF DESCRIPTION OF THE DRAWINGS

Other apparatuses, methods, features, and advantages of the present invention will be apparent to one skilled in the art upon examination of the following figures and detailed description. Component parts shown in the drawings are not necessarily to scale and may be exaggerated to better illustrate the important features of the present invention.

DETAILED DESCRIPTION

Disclosed herein are apparatus, systems, and methods for implementing a portable apparatus for measuring a vehicle frame. The portable apparatus includes a vehicle mount sized and configured to be secured inside of a vehicle frame. The portable apparatus further includes a movable arm, which can be a type of coordinate-measuring machine (CMM). The vehicle mount can be configured to support the movable arm in a fixed position with respect to the vehicle frame while the movable arm performs the measurements. Moreover, the vehicle mount can provide positional adjustment of the movable arm with respect to the vehicle frame.

The apparatus, systems, and methods described herein eliminate the need to move the portable measuring apparatus from door opening to door opening for taking various measurements of the vehicle frame. Moreover, the vehicle mount advantageously is sized and configured to be secured to existing mounting points (e.g., seat mount locations) on the vehicle frame. In this manner, the vehicle frame and the vehicle mount can move together which may eliminate the risk of one of these components inadvertently moving with respect to the other which would generally require recalibrating the system.

Figure 1:
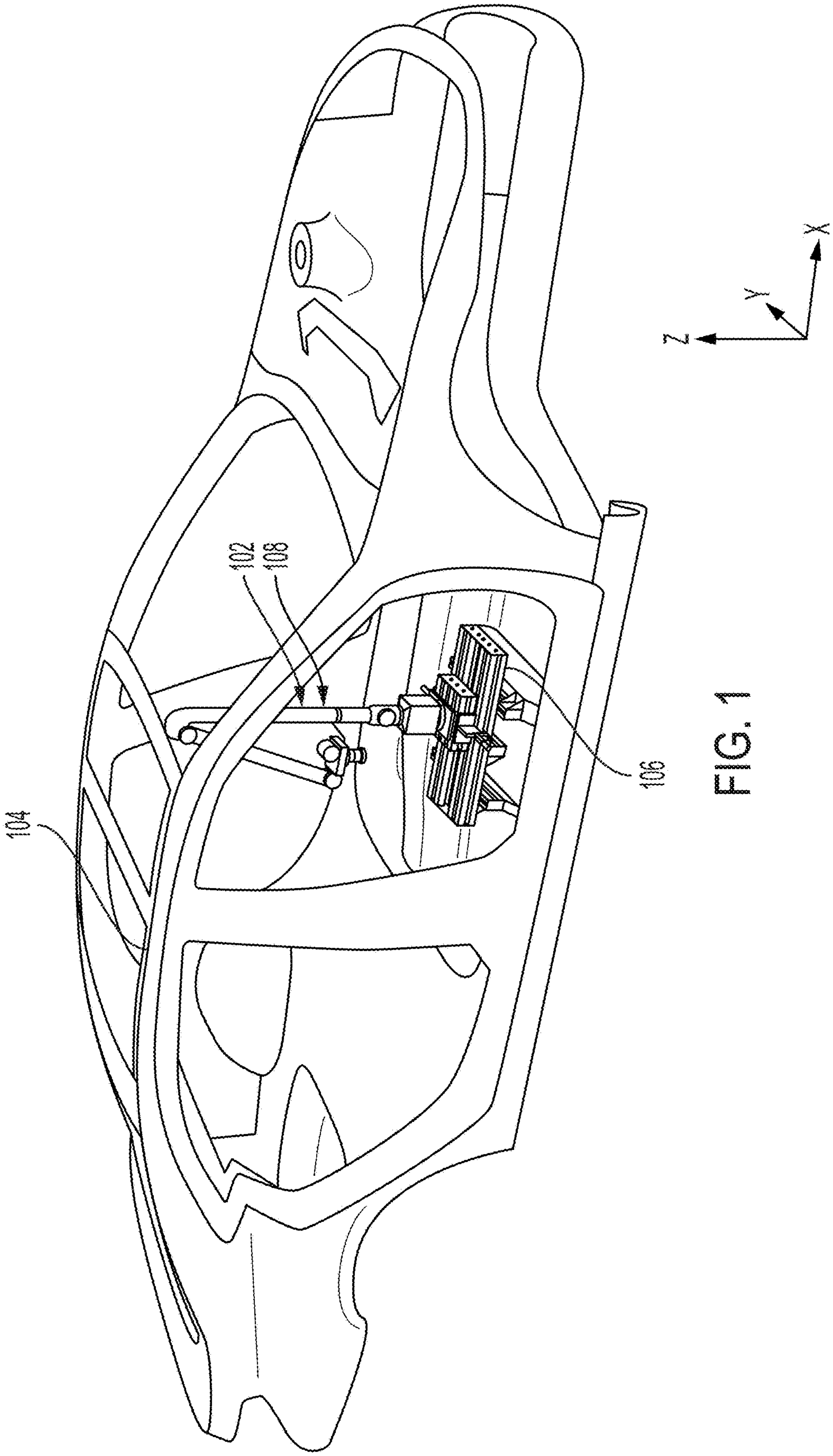
FIG. 1 illustrates a perspective view of a portable vehicle frame measuring apparatus installed on a vehicle frame according to an aspect of the present disclosure.

FIG. 1 illustrates a portable measuring apparatus 102 mounted to a vehicle frame 104. The vehicle frame 104 can be for a conveyance capable of transporting a person, an object, or a permanently or temporarily affixed apparatus. The vehicle frame 104 can be for a self-propelled wheeled conveyance, such as a sedan, a pick-up truck, an SUV, a UTV, a minivan, a stain wagon, or another other motor or battery driven vehicle. For example, a vehicle can be an electric vehicle, a hybrid vehicle, a plug-in hybrid vehicle, a fuel cell vehicle, or any other type of vehicle that includes a motor/generator. FIG. 1 depicts a vehicle frame 104 for a sedan by example. The vehicle frame 104 is in a production stage prior to the vehicle being completely assembled.

The portable apparatus 102 can be configured for measuring the vehicle frame 104. For example, the portable apparatus 102 can perform quality control by measuring locations of known features (e.g., edges, holes, slots, circles, dimples, etc.) of the vehicle frame 104 to ensure the vehicle frame 104 is built to specification within predetermined tolerance limits. The portable apparatus 102 can be a portable CMM.

The portable apparatus 102 can include a vehicle mount 106 and a movable arm 108. The vehicle mount 106 can be configured to support the movable arm 108 in a fixed position with respect to the vehicle frame 104 while the movable arm 108 performs the measurements. Moreover, the vehicle mount 106 can provide positional adjustment of the movable arm 108 with respect to the vehicle frame 104, as described herein in greater detail.

In various aspects, the vehicle mount 106 is mounted directly to the vehicle frame 104. The vehicle mount 106 can be sized and configured to be fastened (e.g., bolted) to existing seat mounts (e.g., threaded bolt holes). In this manner, the vehicle mount 106 advantageously utilizes existing vehicle frame mounting points for securing the vehicle mount 106 to the vehicle frame 104. Moreover, with the vehicle mount 106 secured relative to the vehicle frame 104, the portable apparatus 102 is secured with respect to the vehicle frame 104 thereby limiting the risk of one of these components moving relative to the other which may require recalibration of the system.

Figure 2:
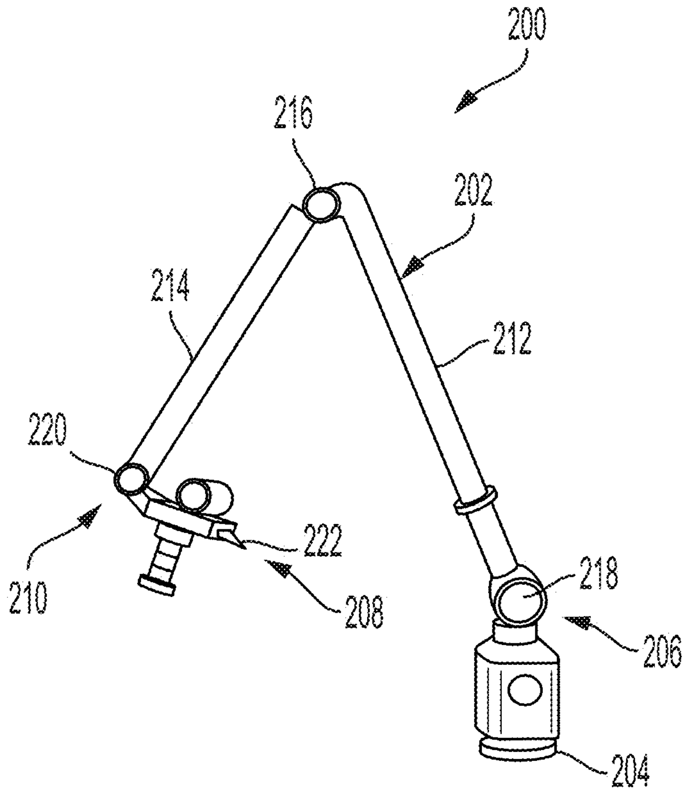
FIG. 2 illustrates an example movable arm of a portable vehicle frame measuring apparatus according to an aspect of the present disclosure.

FIG. 2 illustrates an example movable arm 200, in accordance with various embodiments, the movable arm 200 being one type of CMM. In various aspects, the movable arm 108 of FIG. 1 can be similar to movable arm 200. The movable arm 200 includes an arm portion 202, a support base 204 attached to a first end 206 of the arm portion 202, and a head 208 attached to a second end 210 of the arm portion 202. The first end 206 and the second end 210 are at opposing ends of the arm portion 202. The arm portion 202 includes a first arm segment 212 coupled to a second arm segment 214 via a joint 216 whereby the first arm segment 212 can rotate with respect to the second arm segment 214. The first arm segment 212 can be attached to the support base 204 via a joint 218 whereby the first arm segment 212 can rotate with respect to the support base 204. The head 208 can be attached to the second arm segment 214 via a joint 220 whereby the head 208 can rotate with respect to the second arm segment 214. Each joint 216, 218, 220 can provide for multiple axes of articulated movement. In various aspects, each joint 216, 218, 220 corresponds to a degree of freedom such that the movable arm 200 is movable within a selected volume (e.g., within reach of the movable arm 200).

The arm segments 212, 214 may be made from a suitably rigid material such as but not limited to a carbon composite material for example. A portable movable arm 200 with six or seven axes of articulated movement (i.e., degrees of freedom) provides advantages in allowing the operator to position the head 208 in a desired location within a 360° area about the support base 204 while providing an arm portion 202 that may be easily handled by the operator. However, it should be appreciated that the illustration of an arm portion 202 having two arm segments 212, 214 is for exemplary purposes, and the disclosure should not be so limited. A movable arm 200 may have any number of arm segments coupled together by joints-such as bearing cartridges for example (and, thus, more or less than six or seven axes of articulated movement or degrees of freedom).

In various aspects, the head 208 includes a probe 222, which is a contacting measurement device. The probe 222 can physically contact the object to be measured. The probe 222 can include, but is not limited to: ball, touch-sensitive, curved and/or extension type probes. In various aspects, the measurement is performed, for example, by a non-contacting device such as a light scanner device. Accordingly, the head 208 can include a light scanner in accordance with various aspects. Examples of such measurement devices include, but are not limited to, one or more illumination lights, a temperature sensor, a thermal scanner, a bar code scanner, a projector, a paint sprayer, a camera, or the like, for example.

Each joint 216, 218, 220 can contain an encoder or encoder system (e.g., an optical angular encoder or encoder system). The encoder or encoder system (e.g., a position sensor such as a transducer) provides an indication of the position of the respective arm segments 212, 214 and head 208 that all together provide an indication of the position of the head 208 with respect to the support base 204 (and, thus, the position of the object being measured by the movable arm 200 in a certain frame of reference—for example a local or global frame of reference).

In various aspects, the encoders or encoder systems each contain an optical angular encoder arranged coaxially with the corresponding axis of rotation of, e.g., the arm segments 212, 214. The optical angular encoder can detect rotational (swivel) or transverse (hinge) movement of, e.g., each one of the arm segments 212, 214 about the corresponding axis and can transmit a signal to an electronic data processing system within the movable arm 200 as described in more detail herein below. Each individual raw encoder count can be sent separately to the electronic data processing system as a signal where it is further processed into measurement data. A variety of CMM arms exist and can be used with a vehicle mount (e.g., see FIG. 4) of the present disclosure, such as those manufactured by Faro Technologies and Romer, among others.

Figure 3:
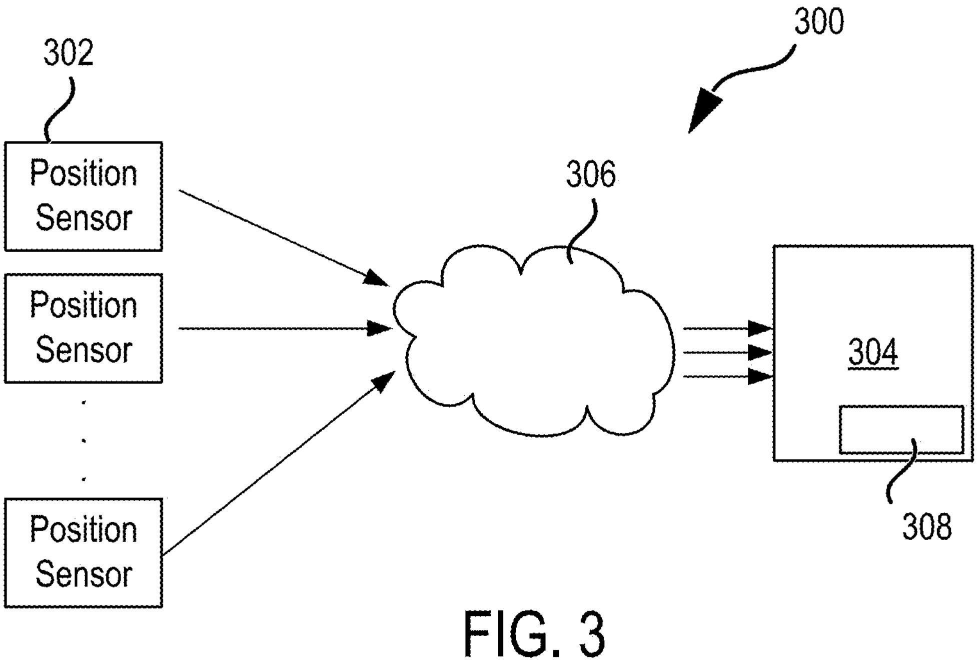
FIG. 3 illustrates a schematic view of a control unit in electronic communication with a plurality of position sensors for a portable vehicle frame measuring apparatus according to an aspect of the present disclosure.

FIG. 3 illustrates a block diagram of the position sensor electronics 300 for a portable measuring apparatus (e.g., the movable arm 200). A plurality of position sensors 302 can be in electronic communication with a controller 304 via a network 306. Further, the position sensor electronics 300 include a memory 308.

The controller 304 may be any suitable processing device or set of processing devices such as, but not limited to, a microprocessor, a microcontroller-based platform, an integrated circuit, one or more field programmable gate arrays (FPGAs), and/or one or more application-specific integrated circuits (ASICs).

The memory 308 may be volatile memory (e.g., RAM including non-volatile RAM, magnetic RAM, ferroelectric RAM, etc.), non-volatile memory (e.g., disk memory, FLASH memory, EPROMS, EEPROMs, memristor-based non-volatile solid-state memory, etc.), unalterable memory (e.g., EPROMs), read-only memory, and/or high-capacity storage devices (e.g., hard drives, solid state drives, etc.). In some examples, the memory 308 includes multiple kinds of memory, particularly volatile memory and non-volatile memory.

The network 306 can be a wired network or a wireless network. The network 306 can be a personal area network (PAN), a local area network (LAN), a wide area network (WAN), a cellular network, the Internet, or combinations thereof, that connects, couples and/or otherwise communicates between the position sensors 302 and the controller 304.

Each position sensor 302 can be configured to measure a position of a corresponding joint of the movable arm 200 (see FIG. 2) and produce a position signal corresponding to said position. The controller 304 can receive the position signal(s) from the position sensor(s) 302 to determine a digital coordinate corresponding to a position of the head 208 (see FIG. 2) in the selected volume. This digital coordinate can be logged (i.e., saved) in the memory 308 and/or sent to a user device for further processing.

In various aspects, the digital coordinate corresponding to a position of the head 208 can be relative to an absolute coordinate system (e.g., the Cartesian system including X, Y, and Z-axis values). With momentary reference to FIG. 1, the X-direction can correspond with a length of the vehicle frame 104, the Y-direction can correspond with a width of the vehicle frame 104, and the Z-direction can correspond with a height of the vehicle frame 104.

Figure 4:
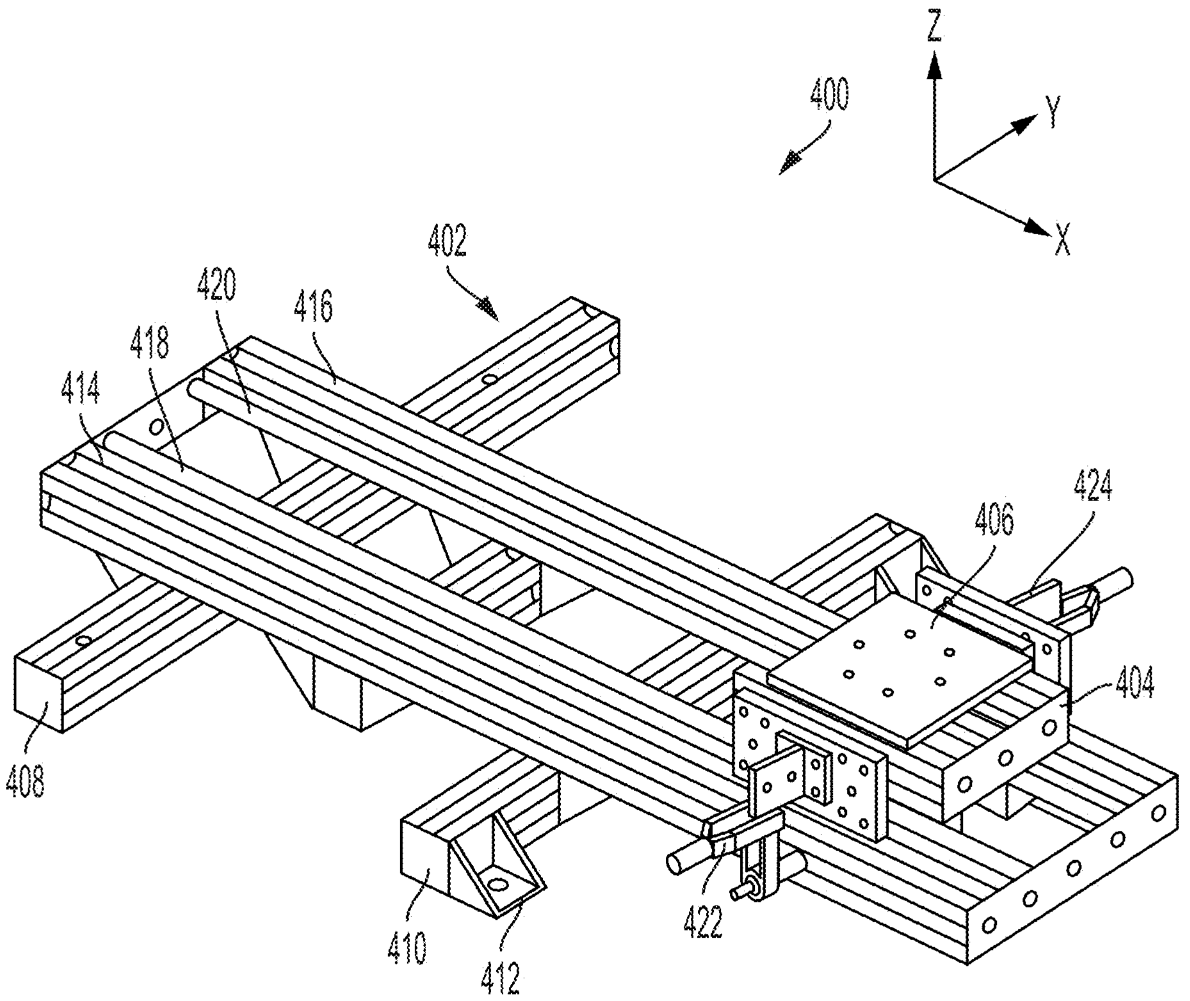
FIG. 4 illustrates a perspective view of a vehicle mount for a movable arm according to an aspect of the present disclosure.

FIG. 4 illustrates a vehicle mount 400 for a portable apparatus for measuring a vehicle frame. In various aspects, the vehicle mount 106 of FIG. 1 can be similar to vehicle mount 400. The vehicle mount 400 includes a base portion 402 and a mounting plate 404 moveable with respect to the base portion 402. The mounting plate 404 is configured to receive a support base of a movable arm. In this regard, the movable arm can be supported by the mounting plate 404. In various aspects, the mounting plate 404 includes a plurality of apertures whereby the support base of the movable arm is secured to the mounting plate 404. The mounting plate 404 can define a generally planar horizontal surface 406 for receiving the movable arm.

In various aspects, the base portion 402 includes a first support rail 408 including a first attachment feature (not shown in FIG. 4) for mounting the vehicle mount 400 to a vehicle frame. The base portion 402 can further include a second support rail 410 including a second attachment feature 412 for mounting the vehicle mount 400 to a vehicle frame. For example, the first and second attachment features 412 can include a flange with an aperture disposed therein for receiving a fastener (e.g., a bolt) therethrough for securing the vehicle mount 400 to the vehicle frame.

In various aspects, the vehicle mount 400 further includes a first guide rail 414 supported by the first support rail 408 and the second support rail 410. The vehicle mount 400 can further includes a second guide rail 416 supported by the first support rail 408 and the second support rail 410. The second guide rail 416 can be oriented in parallel with, and spaced apart from, the first guide rail 414.

The mounting plate 404 can extend between and to the first guide rail 414 and the second guide rail 416. The first guide rail 414 can include a rod 418 (also referred to herein as a first rod) whereby the mounting plate 404 is slidingly coupled to the first guide rail 414. The second guide rail 416 can include a rod 420 (also referred to herein as a second rod) whereby the mounting plate 404 is slidingly coupled to the second guide rail 416. The rods 418, 420 provide a smooth surface on which the mounting plate 404 rides when moving along the guide rails 414, 416.

The mounting plate 404 is configurable between an unlocked state, wherein the mounting plate 404 is moveable with respect to the first guide rail 414 and the second guide rail 416, and a locked state, wherein the mounting plate 404 is locked in position with respect to the first guide rail 414 and the second guide rail 416. For example, the vehicle mount 400 can include a first clamp 422 mounted to the mounting plate 404 and configured to secure the mounting plate 404 in a plurality of positions along the first guide rail 414. The vehicle mount 400 can further include a second clamp 424 mounted to the mounting plate 404 and configured to secure the mounting plate 404 in a plurality of positions along the second guide rail 416. The first clamp 422 can be configured to contact the first guide rail 414 to secure the mounting plate 404 in position. The second clamp 424 can be configured to contact the second guide rail 416 to secure the mounting plate 404 in position.

In various aspects, the mounting plate 404 is configured to move along the first guide rail 414 and the second guide rail 416 in a first direction (i.e., the X-direction in FIG. 4). In various aspects, the first support rail 408 and the second support rail 410 are oriented perpendicular to the first guide rail 414 and the second guide rail 416. In various aspects, the first guide rail 414 and the second guide rail 416 are adjustable along the first support rail 408 and the second support rail 410 in a second direction (i.e., the Y-direction in FIG. 4) perpendicular to the first direction. Accordingly, the position of the portable measuring apparatus with respect to the vehicle frame can be adjusted as desired.

In various aspects, movement of the mounting plate 404 with respect to the guide rails 414, 416 can be monitored (e.g., by the controller 304 of FIG. 3) such that the mounting plate 404 can be moved with respect to the guide rails 414, 416 during a measuring process of a vehicle frame and the controller 304 can consider this movement when determining relative positions of vehicle frame features. For example, the mounting plate 404 can be mounted to a ball screw and lead screw or similar arrangement. The sensors 302 (see FIG. 3) can include a position sensor (e.g., an angular encoder system or any other suitable position sensor) that is used to monitor the position of the mounting plate 404 relative to the guide rails 414, 416.

Figure 5A:
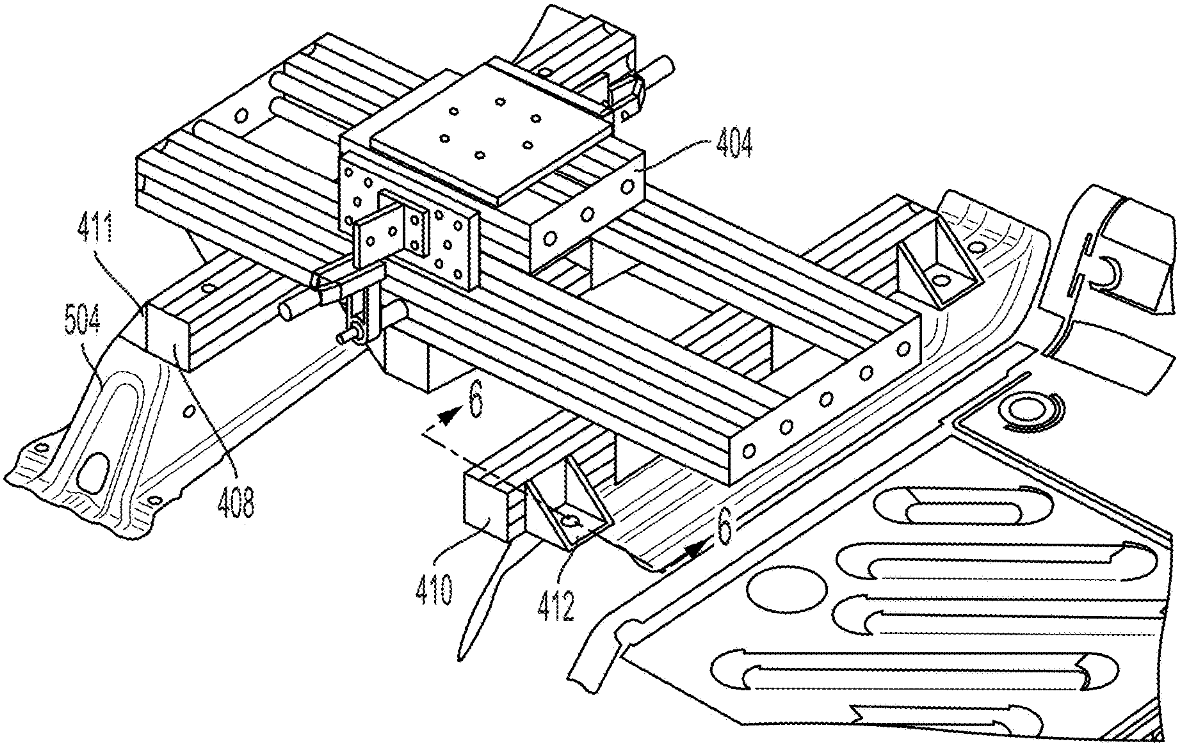
FIG. 5A illustrates a perspective view of a vehicle mount installed on a vehicle frame with a mounting plate of the vehicle mount in a first position according to an aspect of the present disclosure.
Figure 5B:
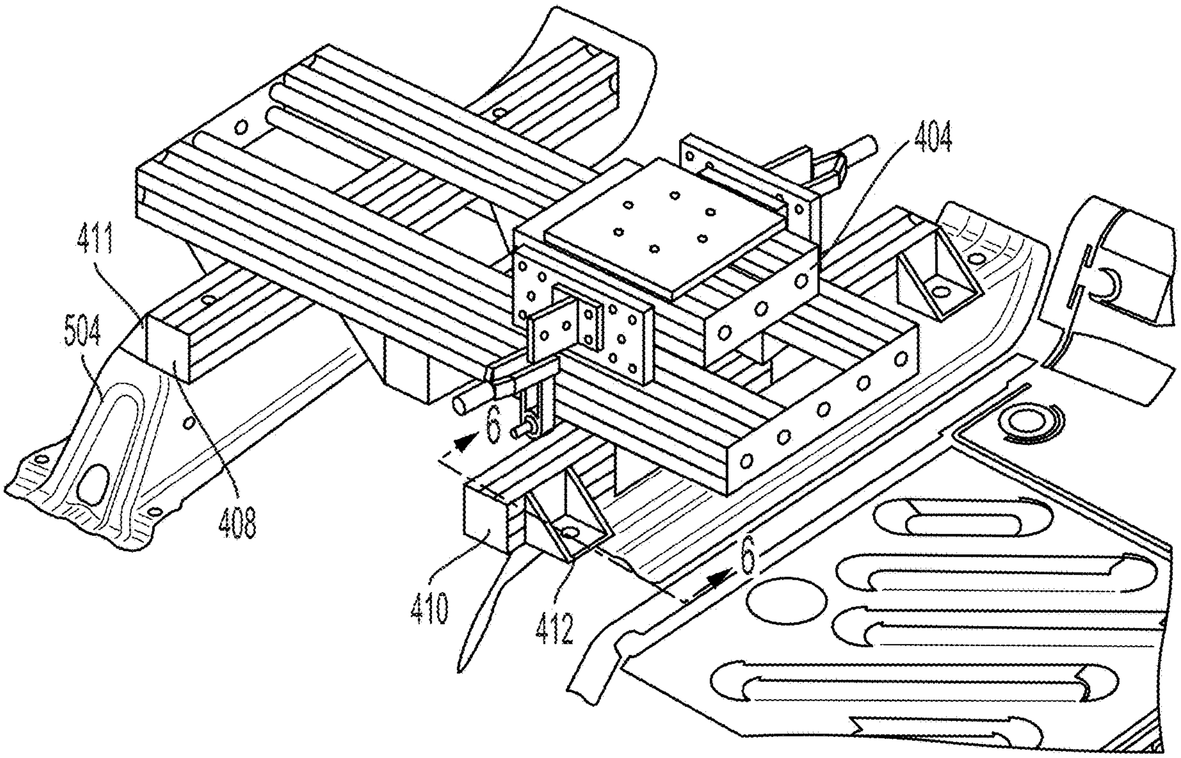
FIG. 5B illustrates a perspective view of the vehicle mount installed on the vehicle frame with the mounting plate of the vehicle mount in a second position according to an aspect of the present disclosure.

FIG. 5A and FIG. 5B illustrate the vehicle mount 400 installed to a vehicle frame 504 with the mounting plate 404 in a first position and a second position, respectively. FIG. 5A shows the vehicle mount 400 secured to the vehicle frame 504 at existing seat mounts in the vehicle frame 504. For example, the first support rail 408 is secured to a first seat mount via the first attachment feature 411 and the second support rail 410 is secured to a second seat mount via the second attachment feature 412. The first support rail 408 and the second support rail 410 can include additional attachment features. For example, FIG. 5A and FIG. 5B show each support rail 408, 410 having two attachment features whereby the vehicle mount 400 is secured to seat mounts of the vehicle frame 504.

Figure 6:
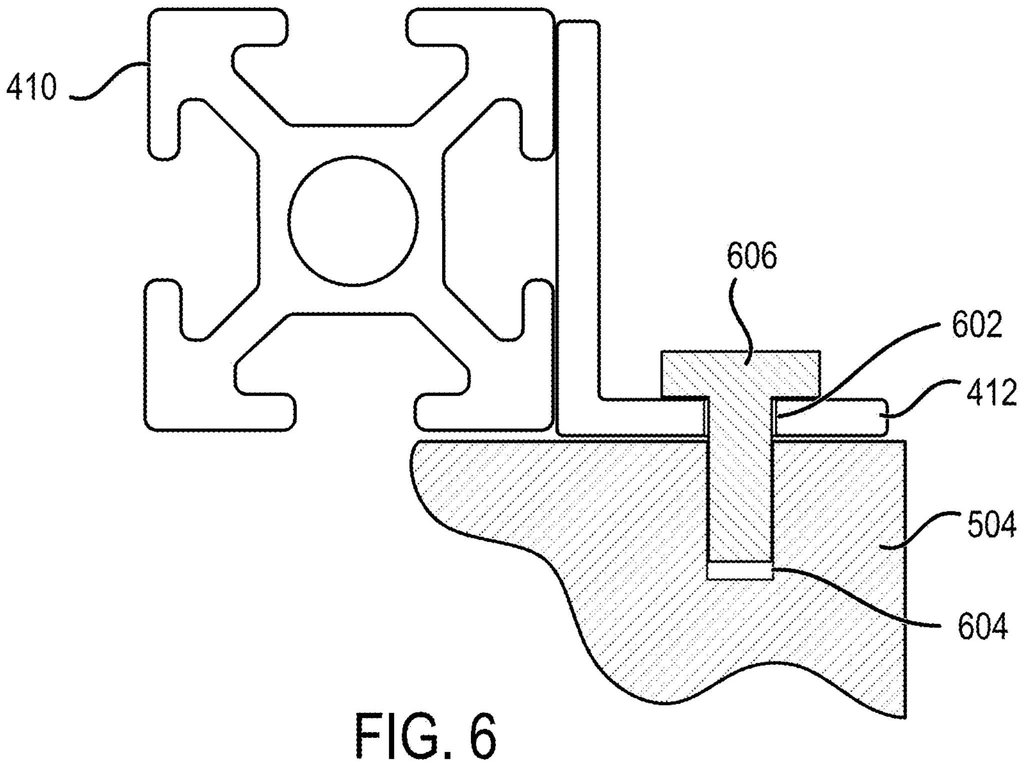
FIG. 6 illustrates a section view of a connection between the vehicle mount and the vehicle frame according to an aspect of the present disclosure.

FIG. 6 is a section view of an example connection between the vehicle mount 400 and the vehicle frame 504. The second attachment feature 412 can include an aperture 602. The aperture 602 can be placed in alignment with a seat mount aperture 604 of the vehicle frame 504. A fastener 606, such as a bolt, can be placed through the aperture 602 of the second attachment feature 412 and into the seat mount aperture 604. The fastener 606 can be tightened to secure the vehicle mount 400 to the vehicle frame 504. The vehicle mount 400 can include one or more attachment features (e.g., two attachment features one each support rail) that similarly align with corresponding seat mount apertures in the vehicle frame 504.

In various aspects, the second support rail 410 can be extruded from a metal, such as aluminum, with one or more slots (e.g., T-slots) or bolt galleys 608. Attachment features of the first guide rail 414 or the second guide rail 416 (see FIG. 4) can slide along the bolt galleys 608 for adjusting the point of attachment to the second support rail 410. The first support rail 408, the first guide rail 414, and/or the second guide rail 416 can be similar made of extruded aluminum or another material as desired. The first support rail 408, the second support rail 410, the first guide rail 414, and/or the second guide rail 416 may be made from a suitably rigid material such as but not limited to aluminum, steel, and/or carbon composite material, for example.

Figure 7:
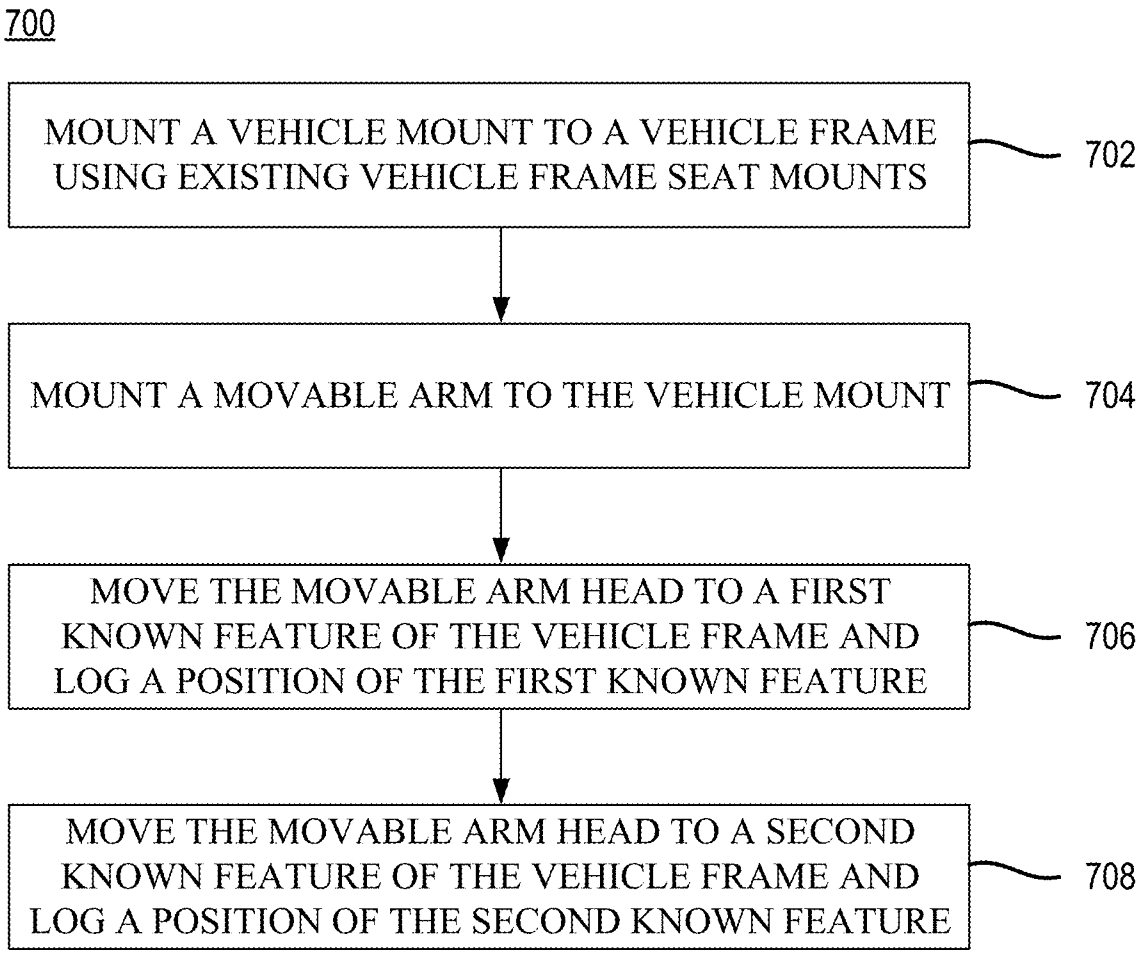
FIG. 7 is a flow diagram of an example process for measuring a vehicle frame according to an aspect of the present disclosure.

FIG. 7 is a flow diagram of an example process 700 for measuring a vehicle frame. For ease of description, the process 700 is described below with reference to FIGS. 1-6. The process 700 of the present disclosure, however, is not limited to use of the exemplary vehicle frame measuring systems of FIGS. 1-6.

The vehicle mount 400 can be mounted to the vehicle frame 504 using existing vehicle frame seat mounts (702). For example, the first attachment feature 411 of the vehicle mount 400 can be aligned with a first seat mount (e.g., see aperture 604 of FIG. 6) of the vehicle frame 504. The second attachment feature 412 of the vehicle mount 400 can be aligned with a second seat mount (e.g., see aperture 604 of FIG. 6) of the vehicle frame 504. A first fastener (e.g., see fastener 606 of FIG. 6) can be inserted through the first attachment feature 411 of the vehicle mount 400 and at least partially into the first seat mount. A second fastener (e.g., see fastener 606 of FIG. 6) can be inserted through the second attachment feature 412 of the vehicle mount 400 and at least partially into the second seat mount.

The movable arm 200 can be mounted to the vehicle mount 400 (704). For example, the support base 204 of the movable arm 200 can be received by, and secured to (e.g., via one or more fasteners), the mounting surface 406 of the mounting plate 404.

The head 208 can be moved to a first known feature of the vehicle frame 504 and a position of the first known feature can be logged in memory 308 (706).

The head 208 can be moved to a second known feature of the vehicle frame 504 and a position of the second known feature can be logged in memory 308 (708).

In this manner, a user can determine whether the first known feature and the second known feature are built to the desired specification.

Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus.

Benefits, other advantages, and solutions to problems have been described herein with regard to specific embodiments. Furthermore, the connecting lines shown in the various figures contained herein are intended to represent exemplary functional relationships and/or physical couplings between the various elements. Many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for."

What is claimed is:

1. A vehicle mount for a portable apparatus for measuring a vehicle frame, the vehicle mount comprising:

a first support rail including a first attachment feature configured to align with a first seat mount of the vehicle frame for mounting the vehicle mount to the vehicle frame;

a second support rail including a second attachment feature configured to align with a second seat mount of the vehicle frame for mounting the vehicle mount to the vehicle frame, and the vehicle mount is configured to be secured to the vehicle frame via the first seat mount and the second seat mount;

a first guide rail supported by the first support rail and the second support rail;

a second guide rail supported by the first support rail and the second support rail, the second guide rail is oriented in parallel with, and spaced apart from, the first guide rail; and a mounting plate extending between and to the first guide rail and the second guide rail, the mounting plate is configurable between an unlocked state, wherein the mounting plate is moveable with respect to the first guide rail and the second guide rail, and a locked state, wherein the mounting plate is locked in position with respect to the first guide rail and the second guide rail.

2. The vehicle mount of claim 1, wherein the mounting plate is configured to receive the apparatus for measuring the vehicle frame.

3. The vehicle mount of claim 1, wherein the first guide rail includes a first rod whereby the mounting plate is slidingly coupled to the first guide rail.

4. The vehicle mount of claim 3, wherein the second guide rail includes a second rod whereby the mounting plate is slidingly coupled to the second guide rail.

5. The vehicle mount of claim 1, further comprising a first clamp mounted to the mounting plate and configured to secure the mounting plate in a plurality of positions along the first guide rail.

6. The vehicle mount of claim 1, wherein:

the mounting plate is configured to move along the first guide rail and the second guide rail in a first direction; and the first guide rail and the second guide rail are adjustable along the first support rail and the second support rail in a second direction perpendicular to the first direction.

7. A portable apparatus for measuring a vehicle frame, comprising:

a movable arm having opposed first and second ends, a support base attached to the first end of the movable arm, a head attached to the second end of the movable arm, a plurality of joints with each joint corresponding to a degree of freedom such that said arm is movable within a selected volume, a plurality of position sensors, each position sensor configured to produce a position signal, and a controller for receiving the position signals from the position sensors and providing a digital coordinate corresponding to a position of the head in the selected volume; and a vehicle mount configured to support the movable arm, the vehicle mount including:

a first support rail including a first attachment feature configured to align with a first seat mount of the vehicle frame for mounting the vehicle mount to the vehicle frame;

a second support rail including a second attachment feature configured to align with a second seat mount of the vehicle frame for mounting the vehicle mount to the vehicle frame, and the vehicle mount is configured to be secured to the vehicle frame via the first seat mount and the second seat mount;

a first guide rail supported by the first support rail and the second support rail;

a second guide rail supported by the first support rail and the second support rail, the second guide rail is oriented in parallel with, and spaced apart from, the first guide rail; and a mounting plate configured to receive the support base of the movable arm, the mounting plate extending between and to the first guide rail and the second guide rail, the mounting plate is configurable between an unlocked state, wherein the mounting plate is moveable with respect to the first guide rail and the second guide rail, and a locked state, wherein the mounting plate is locked in position with respect to the first guide rail and the second guide rail.

8. The portable apparatus of claim 7, wherein the first attachment feature is configured to receive a first fastener for coupling the vehicle mount to the vehicle frame and the second attachment feature is configured to receive a second fastener for coupling the vehicle mount to the vehicle frame.

9. The portable apparatus of claim 7, wherein the first guide rail includes a first rod whereby the mounting plate is slidingly coupled to the first guide rail.

10. The portable apparatus of claim 9, wherein the second guide rail includes a second rod whereby the mounting plate is slidingly coupled to the second guide rail.

11. The portable apparatus of claim 7, further comprising a first clamp mounted to the mounting plate and configured to secure the mounting plate in a plurality of positions along the first guide rail.

12. The portable apparatus of claim 7, wherein:

the mounting plate is configured to move along the first guide rail and the second guide rail in a first direction; and the first guide rail and the second guide rail are adjustable along the first support rail and the second support rail in a second direction perpendicular to the first direction.

13. A method for measuring a vehicle frame comprising:

mounting a vehicle mount to the vehicle frame using existing seat mounts of the vehicle frame;

mounting a movable arm to the vehicle mount, the movable arm having opposed first and second ends, a support base attached to the first end of the movable arm and configured to be mounted to a mounting plate of the vehicle mount, a head attached to the second end of the movable arm, a plurality of joints with each joint corresponding to a degree of freedom such that said arm is movable within a selected volume, a plurality of position sensors, each position sensor configured to produce a position signal, and a controller for receiving the position signals from the position sensors and providing a digital coordinate corresponding to a position of the head in the selected volume;

moving the head to a first known feature of the vehicle frame;

logging a first digital coordinate of the first known feature;

moving the head to a second known feature of the vehicle frame; and logging a second digital coordinate of the second known feature.

14. The method of claim 13, wherein the vehicle mount includes a base portion and the mounting plate moveable with respect to the base portion, and mounting the movable arm to the vehicle mount includes mounting the movable arm to the mounting plate.

15. The method of claim 14, wherein the head is moved from the first known feature to the second known feature while the mounting plate remains stationary with respect to the vehicle frame.

16. The method of claim 14, wherein the vehicle mount includes:

the base portion including:

a first support rail including a first attachment feature for mounting the vehicle mount to the vehicle frame;

a second support rail including a second attachment feature for mounting the vehicle mount to the vehicle frame;

a first guide rail supported by the first support rail and the second support rail;

a second guide rail supported by the first support rail and the second support rail, the second guide rail is oriented in parallel with, and spaced apart from, the first guide rail; and the mounting plate configured to receive the support base of the movable arm, the mounting plate extending between and to the first guide rail and the second guide rail, the mounting plate is configurable between an unlocked state, wherein the mounting plate is moveable with respect to the first guide rail and the second guide rail, and a locked state, wherein the mounting plate is locked in position with respect to the first guide rail and the second guide rail.

17. The method of claim 13, wherein mounting a vehicle mount to the vehicle frame using existing seat mounts of the vehicle frame includes:

aligning a first attachment feature of the vehicle mount with a first seat mount of the vehicle frame; and aligning a second attachment feature of the vehicle mount with a second seat mount of the vehicle frame.

18. The method of claim 17, wherein mounting a vehicle mount to the vehicle frame using existing seat mounts of the vehicle frame includes:

inserting a first fastener through the first attachment feature of the vehicle mount and at least partially into the first seat mount; and inserting a second fastener through the second attachment feature of the vehicle mount and at least partially into the second seat mount.

* * * * *